United States Patent [19]
Wagner et al.

[11] Patent Number: 5,348,042
[45] Date of Patent: Sep. 20, 1994

[54] CERAMIC-PLATE FLOW-CONTROL VALVE

[75] Inventors: Friedrich Wagner, Endingen; Walter Grau, Malhberg, both of Fed. Rep. of Germany

[73] Assignee: Friedrich Grohe Aktiengesellschaft, Hemer, Fed. Rep. of Germany

[21] Appl. No.: 46,005

[22] Filed: Apr. 9, 1993

[30] Foreign Application Priority Data

Apr. 11, 1992 [DE] Fed. Rep. of Germany ....... 4212236

[51] Int. Cl.$^5$ .................... F16K 3/02; F16K 25/00; F16K 51/00
[52] U.S. Cl. ................. 137/237; 137/454.5; 137/625.31; 251/208
[58] Field of Search .............. 137/454.2, 454.5, 454.6, 137/625.31, 237; 251/205, 206, 207, 208

[56] References Cited

U.S. PATENT DOCUMENTS

| | | | |
|---|---|---|---|
| 151,401 | 5/1874 | Kilgore | 137/625.31 |
| 4,005,728 | 2/1977 | Thorp | 137/454.6 |
| 5,014,736 | 5/1991 | Korfgen et al. | 251/208 |
| 5,054,521 | 10/1991 | Hendrick | 251/208 |
| 5,088,688 | 2/1992 | Knapp | 137/454.5 |
| 5,107,884 | 4/1992 | Orlandi | 137/625.31 |

FOREIGN PATENT DOCUMENTS

| | | |
|---|---|---|
| 2805038 | 8/1979 | Fed. Rep. of Germany . |
| 7827429 | 5/1980 | Fed. Rep. of Germany . |
| 3031380 | 2/1982 | Fed. Rep. of Germany .......... 137/625.31 |
| 3140353 | 2/1989 | Fed. Rep. of Germany . |
| 175767 | 6/1961 | Sweden ........................... 251/208 |

Primary Examiner—George L. Walton
Attorney, Agent, or Firm—Herbert Dubno; Andrew Wilford

[57] ABSTRACT

A flow-control valve has a housing having a chamber into which opens a port, a ceramic valve plate fixed in the chamber over the port, formed with a throughgoing aperture aligned with the port, and having a substantially planar face, and a ceramic control plate having a substantially planar face lying flatly on the valve-plate face and formed with a throughgoing aperture. The control plate can be pivoted relative to the valve plate about an axis substantially perpendicular to and traversing the surfaces between an open position with the control-plate aperture overlapping the valve-plate aperture and a closed position with the control-plate aperture aligned axially with a portion of the valve-plate face and offset angularly from the valve-plate aperture and with the valve-plate aperture aligned axially with a portion of the control-plate face and offset angularly from the control-plate aperture. One of the faces is formed in a region offset from the respective face portion with a shallow recess open toward the other face. The recess is located such that in the open position of the valve it opens parallel to the faces into the aperture of the plate of the other face.

11 Claims, 2 Drawing Sheets

CERAMIC-PLATE FLOW-CONTROL VALVE

FIELD OF THE INVENTION

The present invention relates to a flow-control valve. More particularly this invention concerns such a valve which has two relatively slidable apertured ceramic plates that are used to control flow.

BACKGROUND OF THE INVENTION

As described in German patent document 3,140,353 filed 10 Oct. 1980 by F. Wagner, German patent 2,805,038 of H. Oberdorfer, and in German utility model 7,827,429 published 08 May 1980, a standard ceramic-plate flow-control valve has a housing having a chamber into which opens a port, a ceramic valve plate fixed in the chamber over the port, formed with a throughgoing aperture aligned with the port, and having a substantially planar face, and a ceramic control plate having a substantially planar face lying flatly on the valve-plate face and formed with a throughgoing aperture. The control plate can be pivoted relative to the valve plate about an axis substantially perpendicular to and traversing the surfaces between an open position and a closed position. In the open position the control-plate aperture overlaps the valve-plate aperture for flow through the two apertures. In the closed position the control-plate aperture is aligned axially with a portion of the valve-plate face and is offset angularly from the valve-plate aperture and the valve-plate aperture is aligned axially with a portion of the control-plate face and is offset angularly from the control-plate aperture.

Such a valve can be used as a finely adjustable flow-control valve and/or as a shutoff valve. The valve is typically moved from the fully open to the fully closed position by pivoting a handle through at most 180°, and normally has a very smooth action.

The main disadvantage of such a valve is that it leaks if the plate faces are damaged at all. Thus if grit from the liquid passing through the valve gets between these faces, each time the valve is actuated it abrades both faces and damages them, leading inevitably to leakage. This type of wear is a particular problem in the annular outer-edge region that is never overlain by the plate apertures, since any material trapped here is not flushed out during the normal operation of the valve. Furthermore the valve can dry out in the nonoverlap regions and become sticky.

OBJECTS OF THE INVENTION

It is therefore an object of the present invention to provide an improved ceramic-plate flow-control valve.

Another object is the provision of such an improved ceramic-plate flow-control valve which overcomes the above-given disadvantages, that is which prevents grit trapped between the faces from damaging them.

SUMMARY OF THE INVENTION

A flow-control valve has a housing having a chamber into which opens a port, a ceramic valve plate fixed in the chamber over the port, formed with a throughgoing aperture aligned with the port, and having a substantially planar face, and a ceramic control plate having a substantially planar face lying flatly on the valve-plate face and formed with a throughgoing aperture. The control plate can be pivoted relative to the valve plate about an axis substantially perpendicular to and traversing the surfaces between an open position with the control-plate aperture overlapping the valve-plate aperture and a closed position with the control-plate aperture aligned axially with a portion of the valve-plate face and offset angularly from the valve-plate aperture and with the valve-plate aperture aligned axially with a portion of the control-plate face and offset angularly from the control-plate aperture. According to the invention one of the faces is formed in a region offset from the respective face portion with a shallow recess open toward the other face. The recess is located such that in the open position of the valve it opens parallel to the faces into the aperture of the plate of the other face.

Thus with this invention every portion of both plate faces is at one time or another open to flow through the valve so any grit or particles can be flushed from it. Thus if a particle gets wedged between the two plates, the next time the valve is moved between its open and closed positions, this portion will either be swept by the plate apertures or by the recess. Either way, the particle will no longer be trapped so that it can be washed away. Nonetheless these recesses are positioned such that when the valve is fully closed, they are out of the way and do not interfere with the operation of the valve. Furthermore the fact that every portion of both faces is periodically swept either by the aperture of the other face or by the recess ensures that the plane where the faces meet will not dry out and the valve will not get sticky.

According to the invention the one face has an outer edge and the recesses extend to the outer edge. The aperture of the one face has a periphery and the recess extends to the periphery. In fact the apertures each lie to one side of a diametral line extending on the face through the axis. In one arrangement the recess is on the same side of the diametral line as the respective aperture and in fact the one plate can be formed with a plurality of such recesses angularly spaced from one another and all lying on the same side of the line as the respective aperture. In another arrangement according to the invention the recess is on the opposite side of the diametral line as the respective aperture and similarly the one plate is formed with a plurality of such recesses angularly spaced from one another and all lying on the opposite side of the line as the respective aperture.

The apertures of the plates in accordance with this invention are generally semicircular. Furthermore the recess is flat bottomed and has a depth below the face of between 0.2 mm and 0.4 mm. The one face is formed with a plurality of such recesses spaced angularly from one another and shaped generally as segments of a circle.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
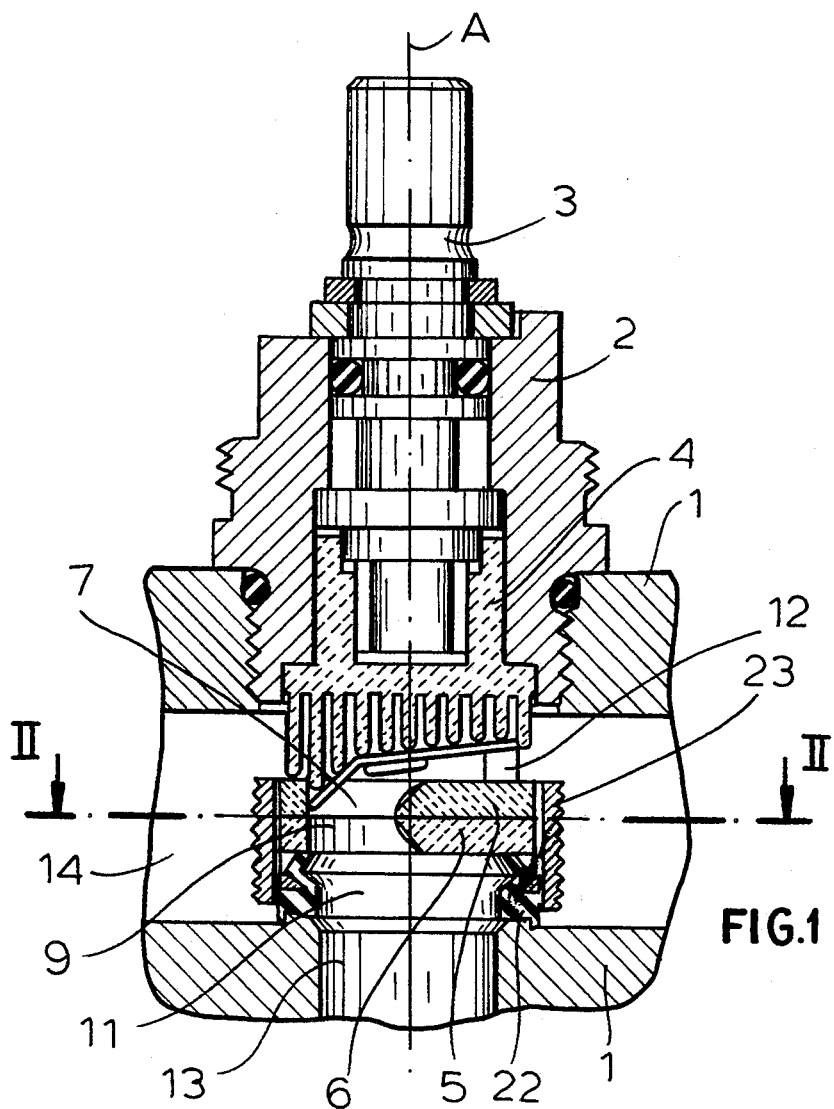
FIG. 1 is an axial section through a valve according to the invention.
Figure 2:
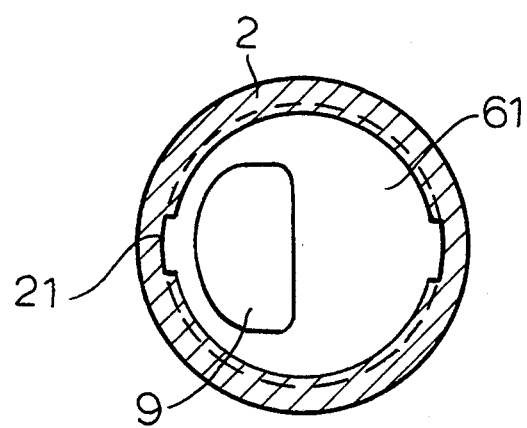
FIG. 2 is a section taken along line II—II of FIG. 1.
Figure 4:
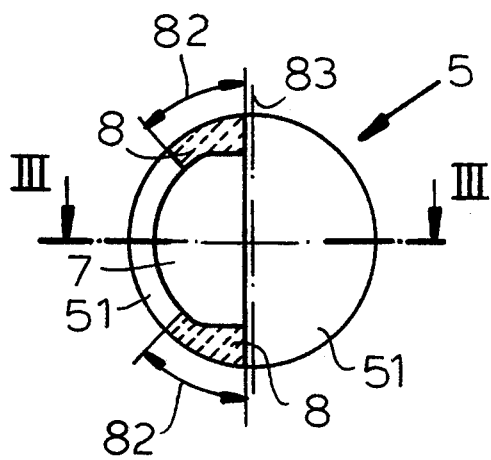
FIG. 4 is a view taken in the direction of arrow IV of FIG. 3.
Figure 3:
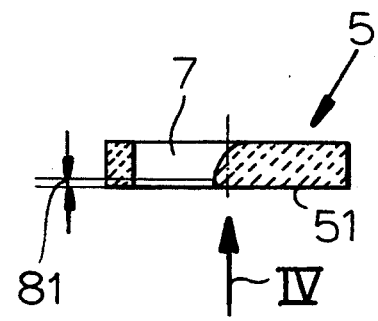
FIG. 3 is a section taken along line III—III of FIG. 4.

As seen in FIGS. 1 through 4 a valve according to this invention has a housing 1 forming a compartment 14 into which opens an inlet port 13. A valve body 2 centered on an axis A and threaded into the housing 1 has a lower ring part 23 holding a seal ring 22 that it presses down around the port 13. A valve stem 3 rotatable about the axis A is coupled to a ceramic valve-actuating member 4 formed with a passage 12.

The ring part 7 of the valve body 2 holds a lower ceramic valve plate 6 that has a planar upper face 61 and that is fitted into grooves 21 (FIG. 2) in the ring part 23 so that it cannot rotate about the axis A. This valve plate 6 sits atop the seal ring 22 and is formed to one side of a diametral line with a generally semicircular axially throughgoing aperture 9.

A ceramic control plate 5 rotationally coupled to the rotary valve parts 3, 4 is of the same circular shape as the plate 6 and has a planar lower face 51 that sits in planar surface contact atop the face 61 of the plate 6. This plate 5 is also formed to one side of a diametral line 83 (FIG. 4) with a generally semicircular axially throughgoing aperture 7 identical in shape to the aperture 9. The above-described structure is all substantially identical to that described in above-cited German patent document 3,140,353.

In the open position shown in FIG. 1, water can flow up from the inlet port 13 through the two apertures 9 and 7 and then through the passage 12 into the valve chamber 14. In an unillustrated closed position the control plate 5 is rotated through 180° about the axis A so that the two apertures 7 and 9 do not overlap at all and flow is blocked. In intermediate positions the two apertures 7 and 9 overlap by less than their full flow cross sections to restrict flow.

According to the invention in the arrangement of FIGS. 1 through 4 the planar face 51 of the plate 5 is formed with a pair of recesses 8 extending over an angle 82 of about 45° relative to the axis A in regions starting at the diametral line 83 roughly defining an edge of the aperture 7 to the same side of this line as this aperture 7. These recesses 8 have flat bottoms recessed by a small distance 81 of about 0.2 mm to 0.4 mm. These recesses 8 run from the radial outermost edge of the face 51 to the periphery of the aperture 7 so that when the valve is open they open into the stream passing through the valve.

Thus as the valve is moved between its open and closed positions, any particles that get trapped between the faces 51 and 61 will either be in the regions that are exposed through the apertures 7 and 9 or in the regions 8. Thus such particles will be flushed away and will not remain trapped.

Figure 5:
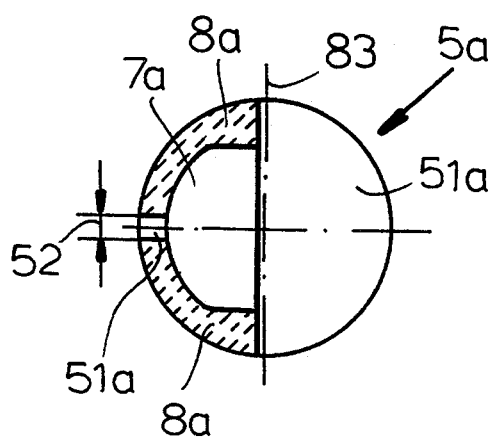
FIGS. 5, 6, and 7 are views like FIG. 4 of alternative plates according to the invention.

In the arrangement of FIG. 5 the valve disk 5a has a surface 51a formed with two much larger recesses 8a adjacent the aperture 7a, leaving only a small portion of the surface 51a having an angular width 52 of 1.5 mm to 2 mm. The angular extent of each of the recesses 8a is about 75°. Since in reality the straight edge of the aperture 7a is offset slightly from the diametral line 83, when the valve is closed the recesses 8a will be wholly offset from and out of communication with the aperture 9.

Figure 6:
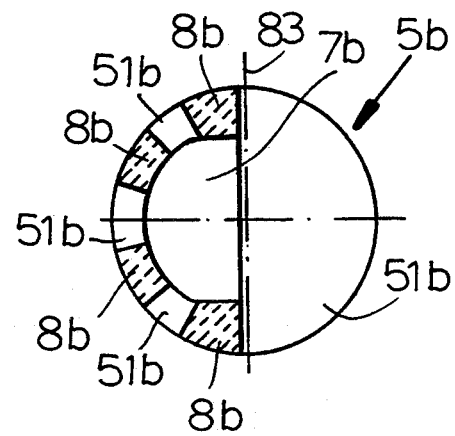

In FIG. 6 the valve disk 5b is formed with four such recesses 8b, breaking up the face 51b into three small sectoral regions 51b around the aperture 7b.

Figure 7:
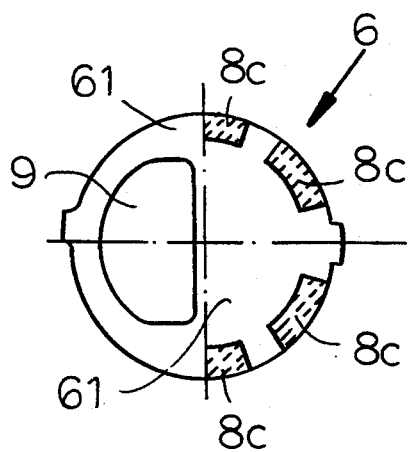

Finally, FIG. 7 shows how it is possible to form outer edge regions of the face 61 of the valve plate 6 with four sectoral recesses 8c all lying to the side of the line 83 away from the aperture 9. Such recesses 8c can be instead of or in addition to the recesses described above, so long as they are dimensioned and positioned so they do not allow portions of the face 51, 51a, or 51b to drop into them.

We claim:

1. In a flow-control valve comprising:
   a housing having a chamber into which opens a port;
   a ceramic valve plate fixed in the chamber over the port, formed with a throughgoing aperture aligned with the port, and having a substantially planar face;
   a ceramic control plate having a substantially planar face lying flatly on the valve-plate face and formed with a throughgoing aperture; and
   means for pivoting the control plate relative to the valve plate about an axis substantially perpendicular to and traversing the surfaces between
   an open position with the control-plate aperture overlapping the valve-plate aperture and
   a closed position with the control-plate aperture aligned axially with a portion of the valve-plate face and offset angularly from the valve-plate aperture and with the valve-plate aperture aligned axially with a portion of the control-plate face and offset angularly from the control-plate aperture,
   the improvement wherein
   one of the faces is formed in a region offset from the respective face portion with a shallow recess open toward the other face, the recess being located such that in the open position of the valve it opens parallel to the faces into the aperture of the plate of the other face and in the closed position of the valve it is axially closed by the face of the other plate.

2. The flow-control valve defined in claim 1 wherein the one face has an outer edge and the recesses extend to the outer edge.

3. The flow-control valve defined in claim 2 wherein the aperture of the one face has a periphery and the recess extends to the periphery.

4. The flow-control valve defined in claim 3 wherein the apertures each lie to one side of a diametral line extending on the face through the axis.

5. The flow-control valve defined in claim 4 wherein the recess is on the same side of the diametral line as the respective aperture.

6. The flow-control valve defined in claim 5 wherein the one plate is formed with a plurality of such recesses angularly spaced from one another and all lying on the same side of the line as the respective aperture.

7. The flow-control valve defined in claim 4 wherein the recess is on the opposite side of the diametral line as the respective aperture.

8. The flow-control valve defined in claim 7 wherein the one plate is formed with a plurality of such recesses angularly spaced from one another and all lying on the opposite side of the line as the respective aperture.

9. The flow-control valve defined in claim 1 wherein the apertures are generally semicircular.

10. The flow-control valve defined in claim 1 wherein the recess is flat bottomed and has a depth below the face of between 0.2 mm and 0.4 mm.

11. The flow-control valve defined in claim 1 wherein the one face is formed with a plurality of such recesses spaced angularly from one another and shaped generally as segments of a circle.

* * * * *